United States Patent [19]
Prindle, Jr. et al.

[11] Patent Number: 5,811,470
[45] Date of Patent: Sep. 22, 1998

[54] FLAME RETARDANT STYRENIC POLYMERS

[75] Inventors: John C. Prindle, Jr.; Christopher J. Nalepa; Govindarajulu Kumar, all of Baton Rouge, La.

[73] Assignee: Albemarle Corporation, Richmond, Va.

[21] Appl. No.: 921,205

[22] Filed: Aug. 27, 1997

Related U.S. Application Data

[63] Continuation-in-part of Ser. No. 643,717, May 6, 1996, abandoned.

[51] Int. Cl.⁶ ..................... C08K 5/5397; C08K 5/5317; C08K 5/523; C08K 5/50; C08K 3/06
[52] U.S. Cl. ............................. 521/85; 521/146; 524/80; 524/116; 524/129; 524/131; 524/134; 524/137; 524/139; 524/141; 524/145; 524/146; 524/147; 524/154
[58] Field of Search ............................. 524/80, 116, 129, 524/131, 134, 137, 141, 145, 146, 147, 154, 139; 521/85, 146

[56] References Cited

U.S. PATENT DOCUMENTS

| | | | |
|---|---|---|---|
| 3,290,413 | 12/1966 | Fettes | 260/874 |
| 3,341,624 | 9/1967 | Sherr et al. | 260/887 |
| 3,341,625 | 9/1967 | Gillham et al. | 260/887 |
| 3,440,064 | 4/1969 | Ludwig | 106/15 |
| 3,450,667 | 6/1969 | Kopacki | 524/80 |
| 3,542,701 | 11/1970 | Raamodonk | 521/85 |
| 3,772,638 | 11/1973 | Marriott et al. | 521/120 |
| 3,869,526 | 3/1975 | Combey et al. | 524/127 |
| 3,912,792 | 10/1975 | Touval | 524/145 |
| 3,925,265 | 12/1975 | Lin | 524/139 |
| 4,021,406 | 5/1977 | Touval | 260/45.75 B |
| 4,042,561 | 8/1977 | De Edwardo et al. | 524/116 |
| 4,053,456 | 10/1977 | Dieck et al. | 524/116 |
| 4,094,856 | 6/1978 | Guschl | 524/116 |
| 4,348,233 | 9/1982 | Simic | 106/18.23 |
| 4,386,165 | 5/1983 | Suh | 521/98 |
| 4,440,880 | 4/1984 | Albanesi et al. | 523/205 |
| 4,698,215 | 10/1987 | Albanesi et al. | 523/205 |
| 4,909,845 | 3/1990 | Ray et al. | 106/18.12 |
| 5,043,218 | 8/1991 | Hahn et al. | 521/76 |
| 5,130,452 | 7/1992 | Flury et al. | 524/127 |
| 5,223,324 | 6/1993 | McCullough, Jr. et al. | 428/143 |

*Primary Examiner*—Veronica P. Hoke
*Attorney, Agent, or Firm*—E. E. Spielman, Jr.

[57] ABSTRACT

Compositions and methods are described wherein a styrenic polymer is rendered flame retardant by incorporation therein before, during or after its formation, a combination of (a) at least one organic phosphorus additive that (i) is halogen-free, and (ii) is composed solely of carbon, hydrogen, and phosphorus, and optionally and preferably one or more of the elements nitrogen, oxygen, and sulfur; and (b) elemental sulfur; in proportions such that (i) the sulfur content from b) is less than 2 percent by weight of the weight of the styrenic polymer plus the weight of a) and b), and (ii) the styrenic polymer plus ingredients a) and b) can provide test specimens which exhibit an LOI of at least 24 if tested in accordance with ASTM Standard Test Method D 2863-87.

61 Claims, No Drawings

FLAME RETARDANT STYRENIC POLYMERS

REFERENCE TO RELATED APPLICATION

This is a Continuation-in-Part of our prior application Ser. No. 08/643,717, filed May 6, 1996 now abandoned.

TECHNICAL FIELD

This invention relates to novel flame retardant compositions and to styrenic polymers containing such compositions.

BACKGROUND

Certain types of halogen-containing compounds have long been known and used as flame retardants for various plastics and polymers, such as styrenic polymers. However, in recent years environmental concerns have engendered a need for new highly-effective halogen-free flame retardant systems.

In the early 1960's it was found that certain halogen-free phosphorus compounds could be used as flame retardants for thermoplastic products including polystyrene. Thus in U.S. Pat. Nos. 3,341,624 and 3,341,625 (both of which issued in September 1967) it is reported that certain S,S,S-trihydrocarbyl-substituted trithiophosphates and certain hydrocarbyl-substituted phosphine oxides and phosphine sulfides, respectively, could be used for this purpose. The patents recommend as preferred concentrations, use of 15 to 25% by weight of these flame retardants.

U.S. Pat. No. 3,542,701 (issued in November, 1970) indicates that flammability of foamed synthetic polymers may be decreased by addition of sufficient sulfur to produce a cellular surface layer having an average depth of at least 1 mm. While the minimum level of sulfur mentioned is 2% by weight, the patent recommends 3 to 35% by weight and indicates that the total amount of elemental sulfur in the foam may be as high as slightly under 50% by weight. Example II of the patent describes use in polystyrene foam of the combination of 3 wt % sulfur and 2 wt % tris(2,3-dibromopropyl) phosphate, and remarks that this combination "is very efficacious."

U.S. Pat. No. 3,912,792 (issued in October, 1975) reports that unlike unhalogenated phosphorus compounds, halogenated aromatic phosphates, halogenated thiophosphates and halogenated thiophosphoryl chlorides are unique in their ability to enhance rather than inhibit the flame retardancy imparted to organic polymers by mixtures of antimony trioxide with halogen-containing compounds. It is specified in the patent that the halogenated aromatic phosphorus compounds are to contain at least three halogen (bromine and/or chlorine) atoms per phenyl group in the compound. Among the halogenated organic compounds referred to in the patent for use in the multicomponent flame retardant systems are chlorinated alkanes, chlorinated olefins, chlorinated aromatics, chloroalcohols, chloroaldehydes, and analogous brominated compounds. The patent further reports that the presence of sulfur in the antimony trioxide-halogenated organic-halogenated aromatic phosphorus compound flame retardant decreases the amount of the flame retardant required to attain a given level of performance. As to this effect of sulfur in these mixtures, the patent states: "This is considered surprising since sulfur has not been shown to impart any significant degree of flame retardancy to flammable organic polymers." U.S. Pat. No. 4,021,406 (issued in May 1977) is indicated to be a division of U.S. Pat. No. 3,912,792 and thus presumably contains the same disclosure.

In the case of styrenic polymer foams, U.S. Pat. No. 4,386,165 (issued in May 1983) points out that impart reduced flammability prior art approaches include (a) the incorporation into the styrenic foams of relatively large quantities of halogen-containing compounds as flame retardants; (b) the incorporation of somewhat smaller amounts of halogen-containing compounds in conjunction with organic peroxide compounds; and (c) incorporation, in combination with iron naphthenate, of chlorine compounds such as chlorinated paraffins. To overcome deficiencies of such prior approaches, the patent teaches use in styrenic polymer foams of the combination of one or more "conventional non-waxy halogenated flame retarding agents" and a waxy material which may itself be halogenated or non-halogenated. Specifically described in the patent as suitable non-waxy halogenated flame retarding agents that can be used in accordance with the patent are the following compounds which are stated to be conventionally employed in styrenic polymer foams: monochloropentabromocyclohexane, tetrabromobutane, dibromoethylbenzene, dibromopropanol, hexachlorocyclopentadiene, and hexabromocyclododecane.

U.S. Pat. No. 5,223,324 (issued in June, 1993) indicates that while additives such as aluminum trihydride, phosphorus-containing compounds and halogenated polyols, especially brominated polyols such as dibromoneopentyl glycol, tend to increase flame resistance of polymer foams such as polyurethane foams, none of these has proved entirely satisfactory. To increase the flame resistance of foams made of polyurethane or polystyrene, the patent describes use of linear and/or non-linear non-graphitic carbonaceous fiber as flame retardant components in the foams. It is indicated that the carbonaceous materials can be used either as the sole flame-retarding additive or in combination with other flame retarding additives such as halogen and/or phosphorus containing compounds, antimony oxides, and boron-containing compounds.

Other disclosures of various phosphorus-containing flame retardants include, for example, U.S. Pat. Nos. 3,869,526; 3,925,265; and 4,094,856.

A most welcome contribution to the art would be a new flame retardant composition devoid of any halogen-containing component which nonetheless is capable of exhibiting good flame retardant effectiveness as shown for example in the standard ASTM limiting oxygen index (LOI) test. The limiting oxygen index (LOI) of thermoplastic styrenic polymers is of particular interest, inasmuch as a high LOI indicates that the polymer when foamed may exhibit good flame resistance under actual service conditions.

A particular need exists for a suitably effective flame retardant system for styrenic polymers that is devoid of halogen and that produces an acceptably high LOI value in styrenic polymers. To be of interest to a manufacturer of styrene foams, a halogen-free flame retardant system should exhibit an LOI value of at least 24, as flame retardant systems with LOI values below this level will not be considered for potential use in polystyrene foam. In general, the higher the LOI values above 24, the greater the interest for such use.

THE INVENTION

In the fulfillment of the foregoing need, this invention makes it possible to attain high LOI values in styrenic polymers by employing therein halogen-free flame retardant additive compositions such as are described herein. In addition, this invention makes possible the provision of halogen-free flame retardant additive compositions which exhibit good compatibility with the styrenic polymer substrates.

This invention has made it possible to provide flame retardant styrenic polymer compositions having blended therein halogen-free additive components, whereby such polymer compositions will provide test specimens that exhibit the requisite high LOI values if and when tested in accordance with the LOI test procedure.

Methods of enhancing the LOI properties of styrenic polymers by incorporating therein halogen-free additive components has also been made possible by this invention.

In accordance with this invention it has been found possible, indeed highly advantageous, to use as a flame retardant system in styrenic polymers the combination of (a) a halogen-free organic phosphorus additive and (b) a small amount, viz., less than 2 percent by weight, of elemental sulfur, an amount previously deemed unsuitable according to the teachings of U.S. Pat. No. 3,542,701 referred to above. Indeed, preferred styrenic polymer compositions of this invention are formed by blending with styrenic polymer (a) at least one halogen-free organic phosphorus additive and (b) elemental sulfur, where the amount of sulfur present in the resultant blend (in whatever chemical form(s) or composition(s) the sulfur exists when in the blend) is no more than about 1.5 percent by weight of the styrenic polymer composition, i.e., the weight of (i) the styrenic polymer, (ii) the organic phosphorus additive(s), and (iii) the elemental sulfur, that are present in the composition in whatever chemical form(s) such components exist in the styrenic polymer composition, and excluding the weight of other components that may be included therein. The most preferred styrenic polymer compositions of this invention are those in which the halogen-free organic phosphorus additive is used along with elemental sulfur, where the amount of sulfur present in the styrenic polymer composition is an amount of 1 percent by weight or less based on the weight of the styrenic polymer composition, i.e., the weight of (i) the styrenic polymer, (ii) the organic phosphorus additive(s), and (iii) the elemental sulfur, that are present in the composition in whatever chemical form(s) such components exist in the styrenic polymer composition, and excluding the weight of other components that may be included therein.

By using these materials with the sulfur in the foregoing small amounts in the styrenic polymer composition, it is possible to provide styrenic polymer composition that can provide test specimens that exhibit an LOI of at least 24 if tested in accordance with ASTM Standard Test Method D 2863-87. In fact, preferred styrenic polymer compositions of this invention can provide test specimens that exhibit an LOI of at least 25 if tested in accordance with that test method. Moreover, in the case of particularly preferred embodiments of this invention, it has been found possible to achieve LOI values of 26 and above. And in addition to making it possible to achieve these requisite LOI values, this invention accomplishes this by use of such small amounts of elemental sulfur that there is no material adverse effect upon the physical properties of the styrenic polymer composition or foams or cellular structures formed therefrom, the effect, if any, on physical properties being negligible. Because such small amounts of sulfur are present in the finished styrenic polymer compositions of this invention, not only is the achievement of the foregoing advantages achieved at minimal cost, but the requisite LOI values are achieved with phosphorus and sulfur contents in the styrenic polymer compositions that individually are incapable of achieving the requisite LOI values. And all of these substantial advantages are made possible while at the same time satisfying environmental concerns by avoiding use of halogen-containing additives.

To facilitate the ensuing description, it is to be understood that in referring to the proportion or weight of elemental sulfur in the styrenic polymer composition (whether the styrenic polymer is referred to generically, or specifically as in the case of polystyrene):

A) the specified weight percentage of sulfur (e.g., less than 2%, or etc.) present in the styrenic polymer composition is based on the weight of the styrenic polymer composition;

B) the weight of the styrenic polymer composition means the weight of (i) the styrenic polymer, (ii) the halogen-free organic phosphorus additive(s), and (iii) the elemental sulfur, that are present in the styrenic polymer composition in whatever chemical composition(s) and form(s) the foregoing components (i), (ii) and (iii) acquire and exist when in the styrenic polymer composition; and C) in determining the weight of the styrenic polymer composition, the weight of components other than the foregoing components (i), (ii), and (iii) that may also be present in the overall composition, is excluded.

In accordance with one of its embodiments, this invention provides a composition formed from and by mixing together at least the following components:

I) a styrenic polymer and

II) as a flame retardant therefor, a combination of the following ingredients:

a) at least one organic phosphorus additive that (i) is halogen-free, and (ii) is composed solely of carbon, hydrogen, and phosphorus, and optionally one or more of the elements nitrogen, oxygen, and sulfur; and b) elemental sulfur;

in proportions such that (i) the sulfur content from b) is less than 2 percent by weight of the weight of the styrenic polymer and ingredients a) and b) in whatever chemical composition(s) and form(s) said styrenic polymer and said ingredients exist in said styrenic polymer, and (ii) said styrenic polymer plus said combination of ingredients a) and b) can provide test specimens which exhibit an LOI of at least 24 if tested in accordance with ASTM Standard Test Method D 2863-87. Such styrenic polymer compositions can constitute finished polymer compositions containing minor percentages (e.g., in the range of about 2 to about 20 percent of the total weight of the styrenic polymer composition) of components a) and b) in whatever form they and the styrenic polymer exist after they have been blended together, provided that the amount of component b) used in forming such compositions is less than 2 percent of the weight of the styrenic polymer plus ingredients a) and b). One way of forming styrenic polymer compositions is by use of masterbatch polymer compositions containing styrenic polymer and higher percentages (e.g., more than about 20 percent of the total weight of the composition) of components a) and b) in whatever form they and the styrenic polymer exist after they have been blended together. Such masterbatch compositions can subsequently be used in forming finished styrenic polymer compositions by blending an appropriate amount of the masterbatch with an appropriate amount of styrenic polymer which does not contain the flame retardant components of this invention to thereby produce a blend having the desired end use amounts of components a) and b) in whatever form they and the styrenic polymer exist after being blended together, again provided the amount of component b) included in the finished blend is less than 2 percent by weight of the weight of the styrenic polymer plus ingredients a) and b) in the finished blend.

Flame retardant styrenic polymer compositions of this invention that provide test specimens having even higher LOI values than 24 are even more efficacious for achieving the objective of enhanced flame resistance in styrenic polymers, especially when the polymers are in expanded or foamed condition. Accordingly, flame retarded polymer compositions as described in the immediately preceding paragraph which provide test specimens that exhibit an LOI of 25 or above if and when tested in accordance with ASTM Standard Test Method D 2863-87 constitute a preferred embodiment of this invention. Those flame retardant compositions of this invention in which the LOI of the test specimens is 26 or above are particularly preferred.

In preferred embodiments the styrenic polymer is polystyrene, and in a particularly preferred embodiment the styrenic polymer is a polystyrene suitable for preparation of foamed or expanded polystyrene, such as, for example, a polystyrene that has a peak number average molecular weight in the range of 120,000 to 250,000, and which may be mildly cross-linked.

Except for normal trace quantities of impurities that may occur or remain therein as a consequence of the materials, process or process equipment used in their synthesis or manufacture, the ingredients of the flame retardant compositions used pursuant to this invention do not contain halogen and contain only the elements specified above. Most preferably, the styrenic polymer compositions of this invention also do not contain halogen except for impurities which may occur therein for any of the same reasons. Typically the additive compositions, e.g., a preblend of components a) and b), which can be used in accordance with this invention to prepare the styrenic compositions of this invention, will contain, if any, no more than about 100 parts by weight of halogen impurities per million parts by weight (ppmw) of additive composition, and thus the term "halogen-free" in connection with such additive compositions means that they contain, if any, no more than about 100 ppmw of halogen. The finished styrenic polymer compositions of this invention will typically contain, if any, no more than about 1000 parts by weight of halogen impurities per million parts by weight of the total styrenic polymer composition. Therefore, the term "halogen-free" as used herein in connection with the styrenic polymer compositions means that they contain, if any, no more than about 1000 ppmw of halogen. Usually they will contain less halogen than this, unless a halogen-containing monomer is used in forming the styrenic polymer, or a halogen-containing solvent or a halogen-containing gas is used in preparing the styrenic polymer composition or foam thereof.

A further embodiment of this invention is the method of rendering a styrenic polymer flame resistant which comprises incorporating therein the above ingredients a) and b) in relative proportions and in amounts such that the resultant styrenic polymer composition (i) contains less than 2 percent by weight of sulfur from b) in whatever chemical composition and form said sulfur exists in said polymer composition, and (ii) exhibits an LOI of at least 24 if tested in accordance with ASTM Standard Test Method D 2863-87. Ingredients a) and b) above can be incorporated in the styrenic polymer prior, during, and/or after the formation of the polymer. For example, ingredients a) and b) above can be added to the monomer(s) or to the polymerization system to be used in forming the polymer. Similarly, ingredients a) and b) above can be added to the polymerization mixture during the course of the polymerization reaction itself. Likewise, ingredients a) and b) above can be added to the polymer after it has been produced, this mode of addition being generally preferred. It will also be appreciated that additions can be made in stages, such as prior to and during the polymerization, or prior to and after the polymerization, or during and after the polymerization, or prior to, during and after the polymerization. Whatever mode of addition is selected, it is also possible to introduce ingredient a) before ingredient b), or ingredient b) before ingredient a), or to introduce ingredients a) and b) concurrently. To minimize the likelihood of blending errors it is preferable and convenient to utilize pursuant to this invention a preformed flame retardant additive composition, e.g., a preblend of ingredients a) and b), or a masterbatch composition, e.g., a concentrated mixture made from styrenic polymer plus ingredients a) and b), in the blending operation(s). However ingredients a) and b) can be blended separately into the styrenic polymer in the desired, appropriate amounts.

Still another embodiment of this invention is a method of preparing an extruded styrenic polymer foam which comprises (i) expressing a heat-plastified styrenic polymer gel containing at least one volatile fluid foaming agent and ingredients a) and b) above from a die into a region of lower pressure so that the expressed gel expands into cellular form, and (ii) cooling the expanded cellular polymer to a temperature at which the expanded foam is self-supporting.

The formation of flame retardant expandable granules or beads of a styrenic polymer constitutes yet another embodiment of this invention. The method pursuant to this embodiment comprises impregnating granules of a flame retarded styrenic polymer composition of this invention with a volatile fluid foaming agent under temperature and pressure conditions such that fluid foaming agent permeates or diffuses into the polymer granules to form generally spherical particles capable of further expansion, and cooling and recovering the particles so formed. The permeation or diffusion operation is preferably conducted in an aqueous suspension, and the initial granules used in this method are preferably formed by extruding the styrenic polymer containing ingredients a) and b) into strands and cutting the strands into appropriate granular lengths for use in the impregnation (diffusion) operation.

These and other embodiments and features of this invention will become still further apparent from the ensuing description and appended claims.

Styrenic Polymers

The styrenic polymers which can be used in the practice of this invention are solid polymers of one or more polymerizable alkenyl aromatic compounds. The homopolymer or copolymer typically comprises in chemically combined form at least a major amount (by weight) of at least one alkenyl aromatic compound of the formula

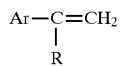

where Ar is an aromatic hydrocarbyl group which may be substituted by one or more chlorine and/or bromine atoms, and R is a hydrogen atom or a methyl group. Preferably the aromatic group Ar is not substituted by any halogen atom, and the resultant styrenic polymer is halogen-free. Examples of such styrenic polymers are homopolymers of styrene, alpha-methylstyrene, o-methylstyrene, m-methylstyrene, p-methylstyrene, ar-ethylstyrene, ar-vinylstyrene, ar-chlorostyrene, ar-bromostyrene, ar-propylstyrene, ar-isopropylstyrene, 4-tert-butylstyrene, o-methyl-alpha-methylstyrene, m-methyl-alpha-methylstyrene, p-methyl-alpha-methylstyrene, ar-ethyl-alpha-methylstyrene, and the solid copolymers of two or more of such alkenyl aromatic compounds with minor amounts (by weight) of other readily polymerizable olefinic compounds such as, for example, methylmethacrylate, acrylonitrile, maleic anhydride, citraconic anhydride, itaconic anhydride, acrylic acid, and rubber reinforced (either natural or synthetic) styrene polymers. It is also possible to employ blends of styrenic polymer with one or more non-styrenic polymers such as poly(2,6-dimethylphenylene oxide), poly(2,6-dimethylphenylene oxide)-co-(2,3,6-trimethylphenylene oxide), and similar polyphenylene oxide polymers; polycarbonates; polysulfones; polyesters; and other suitable polymers. Such base polymer blends (i.e., without reference to additives) are preferably formed from about 40 to about 99.9 weight percent of styrenic polymer, the balance (to 100 weight percent) being one or more of such other polymers.

Normally the styrenic polymers used in the practice of this invention are substantially thermoplastic linear polymers. However for certain utilities such as production of foamed styrenic polymers, the polymer can be a mildly cross-linked styrenic polymer. Among suitable procedures that can be used for producing mildly cross-linked styrenic polymers for use in foaming operations are those set forth, for example, in U.S. Pat. Nos. 4,448,933; 4,532,264; 4,604,426; 4,663,360 and 4,714,716.

Ingredient a)

The halogen-free organic phosphorus compounds used as ingredient a) in the practice of this invention can be trivalent phosphorus compounds or pentavalent phosphorus compounds. Generally speaking, the pentavalent compounds are preferred as at least some of the trivalent phosphorus compounds tend to react in situ with sulfur of component b) and thereby make it desirable to increase the amount of component b) used with such trivalent compounds to compensate for this sulfur uptake.

The halogen-free organic phosphorus compounds may contain one or a plurality of phosphorus atoms per molecule. The principal requirements for the phosphorus compound or mixture of phosphorus compounds used as component a) are that (1) the compound(s) is/are organic phosphorus compound(s), and (2) the compound(s) contain(s) no elements other than carbon, hydrogen, phosphorus, and optionally one or more of the elements oxygen, sulfur and nitrogen. Preferably, but not necessarily, the phosphorus content of the phosphorus compound used, or the average phosphorus content of the phosphorus compounds used (when more than one phosphorus compound is used) is not less than about 6 percent by weight of the phosphorus compound or phosphorus compounds. Preferably the phosphorus content or average phosphorus content of ingredient a) is at least about 8 percent by weight, and compounds with still higher phosphorus contents are even more preferred provided that the compounds are compatible with the styrenic polymer into which they are being blended. As will be seen from the examples hereinafter, compounds with up to as much as about 33% phosphorus have been found suitable for use in this invention, and thus compounds with even higher amounts of phosphorus therein should also be suitable.

Preferred because of their generally greater effectiveness are organic phosphorus compounds as described above which boil, become a vapor, and/or thermally decompose at one or more temperatures in the range of about 250° to about 350° C.

So-called reactive types of halogen-free organic phosphorus additives can be used, if desired. Such materials have the ability because of their chemical structure (e.g., the presence of vinyl olefinic substituents in the molecule) of being reacted into the styrenic polymer during or subsequent to its formation. However use of so-called additive types of organic phosphorus additives are preferred for use in the practice of this invention.

Among the chemical types of halogen-free phosphorus compounds that can be used as ingredient a) are total and partial organic esters of trivalent and pentavalent oxyacids or thioacids or mixed oxy- and thioacids of phosphorus, which compounds may contain from 1 to about 10 atoms of phosphorus per molecule; organic phosphines, phosphine oxides or sulfides; amides of organic esters of trivalent and pentavalent oxyacids or thioacids or mixed oxy- and thioacids of phosphorus in which there is at least one phosphorus-to-nitrogen bond; cyclic organic phosphorus compounds such as phosphetanes, phospholanes, phosphorinanes, and cyclic phosphazenes; linear polyphosphazenes; iminophosphoranes; alkylidenephosphorinanes; and many other similar phosphorus compounds. Thus use can be made, for example, of partial or total organic esters of such acids as phosphorous acid, hypophosphorous acid, orthophosphoric acid, metaphosphoric acid, pyrophosphoric acid, hypophosphoric acid, and their partial or total sulfur analogs. While a great many different types of organic phosphorus compound meeting the above criteria can be used and are effective in achieving the requisite LOI of at least 24 when used with less than 2 percent by weight of elemental sulfur, instances have been observed wherein particular amounts of certain organic phosphorus compounds with particular amounts of sulfur less than 2 percent by weight in the styrenic polymer did not achieve the requisite LOI of 24, and thus the composition was not in accordance with this invention. For this reason it is recommended that in any given situation where the LOI of the composition has not already been established through test, a few pilot tests be conducted wherein the components proposed for use are employed in the proportions proposed for use, to ensure that the requisite LOI of at least 24 is achieved pursuant to this invention.

It is desirable to employ halogen-free organic phosphorus compounds that are readily available in the marketplace or that can be readily synthesized such as triethyl phosphate, tributyl phosphate, triphenyl phosphate, tricresyl phosphate, phenyldicresyl phosphate, dibutyl hydrogen phosphite, diamyl acid phosphate, di(2-ethylhexyl) acid phosphate, tributyl phosphine, tributyl phosphine oxide, tributyl phosphine sulfide, diisodecyl pentaerythritol diphosphite, triphenyl phosphite, poly(dipropyleneglycol) phenyl phosphite (WESTON DHOP), and similar analogs and homologs. Other illustrative phosphorus compounds which have been found effective appear hereinafter in the examples and in the description thereafter. Anyone wishing still further information about organic phosphorus compounds which are available or which can be produced as candidates for use in the practice of this invention, one need only refer to the book by G. M. Kosolopoff *Organophosphorus Compounds,* copyright 1950, published by John Wiley and Sons, 1950; and/or Volume 2 of *Comprehensive Organic Chemistry,* published by Pergamon Press, 1979, Chapter 10 starting on page 1121; and/or Strem Catalog No. 16 (1995–97) published by Strem Chemicals (Newburyport, Mass. 01950) and/or the Aldrich *Catalog Handbook of Fine Chemicals* for the years 1986–1987 (or equivalent volumes in other years), published by Aldrich Chemical Company, Inc., Milwaukee, Wis. 53233) and/or *Chemcyclopedia* 1996, Copyright 1995 by the American Chemical Society, all disclosures of which with respect to organic phosphorus compounds are fully incorporated herein by reference as if fully set forth herein.

Ingredient b)

Ingredient b) is elemental sulfur such as the so-called flowers of sulfur. Elemental sulfur is, of course, readily available as an article of commerce.

The elemental sulfur, can be employed in encapsulated form wherein sulfur is encased by a suitable dried coating material. The encapsulated particles can be in the form of small granules or beads, or in other similar particulate form, wherein the encapsulated granules, beads, or particles are typically no larger than about 500 microns along any spatial axis. Encapsulation may be accomplished in various ways with various suitable coating materials. For example, sulfur may be encapsulated with melamine resin by suitably adapting for encapsulation of sulfur, the general procedures described in U.S. Pat. No. 4,440,880 for encapsulating red phosphorus. Alternatively, pulverulent sulfur may be encapsulated with a polycondensation resin formed from urea and formaldehyde modified with melamine and phenol by suitably modifying the procedures described for encapsulation of red phosphorus in U.S. Pat. No. 4,698,215 so that the procedures are rendered suitable for encapsulating sulfur. The techniques referred to in U.S. Pat. No. 5,043,218 may also be suitably adapted for use in encapsulating sulfur. Still another way of encapsulating sulfur involves use of a suitable coacervation procedure wherein a polymer to constitute the coating is dissolved in a solvent of suitable volatility, the sulfur is introduced and dispersed with the solution and the solvent is removed as a vapor thereby leaving the coated sulfur as a residual product. Various polymers can be used in this manner, such as polyphenylene sulfide, polycarbonate, polyester, and like materials. For further details on procedures that may be applied for the encapsulation of sulfur, one may refer, for example, to Kirk-Othmer, *Encyclopedia of Chemical Technology,* 3rd Edition, (1981) Volume 15, pages 470–493; Thies, C., "Microencapsulation", *Encyclopedia of Polymer Science and Engineering,* Editor: Kroschwitz, J.; (1987), Volume 9, pages 724–745; and Thies, C. "Physicochemical Aspects of Microencapsulation", *Polymer-Plastics Technology and Engineering,* (1975) Volume 5, Number 1, pages 1–22.

If desired, the same general procedures may be used to encapsulate the organic phosphorus ingredient either as a separate entity or as a combination or preblend with the sulfur ingredient.

Proportions and Amounts

As regards relative proportions between ingredients a) and b), ingredients a) and b) are incorporated into the styrenic polymer before, during or preferably after its formation in relative proportions such that the weight ratio of sulfur in b) to phosphorus in a) is always well below about 15:1, and typically is less than about 4:1. Generally speaking, the lower this ratio the better, provided of course that the resultant polymer composition meets the requirement that the resultant polymer composition is capable of providing test specimens that would exhibit an LOI of at least 24 if tested in accordance with ASTM Standard Test Method D 2863-87. Thus, for example, it is preferred where possible to employ ingredients a) and b) in relative proportions such that the weight ratio of sulfur in b) to phosphorus in a) is below about 3:1. The minimum ratio in the practice of this invention is usually at least about 0.05:1. On the basis solely of the disclosure in this specification one skilled in the art will now be able by means of a few simple experiments with the particular materials selected for use, to readily determine suitable relative proportions for the situation at hand. It should be noted that the relative proportions of ingredients a) and b) relate to the sulfur from b) used in forming the particular composition; any sulfur present in component a) is not taken into consideration in arriving at these relative proportions between ingredients a) and b). In all cases, the finished styrenic polymer composition must provide test specimens that can achieve the requisite LOI if tested by the ASTM LOI procedure referred to above, using sulfur in an amount less than 2 percent by weight of the weight of the styrenic polymer composition. It will be recalled that throughout this disclosure, the weight percentage of sulfur is always in reference to the weight of the styrenic polymer plus the weight of ingredients a) and b), and excluding in all cases the weight of any other components or ingredients that may be present.

It is to be noted that all of the phosphorus compounds used as ingredient a) pursuant to this invention have to date been found incapable, at an equal loading of phosphorus but in the absence of the incorporation of component b), of providing test specimens that can achieve the LOI of 24 or more in the ASTM test procedure. Moreover, in the absence of a phosphorus compound as component a), amounts of sulfur as high as 10% by weight have been found incapable of providing test specimens that can achieve the LOI of 24 or more in such test procedure.

As to total quantity of ingredients a) and b) for incorporation in the styrenic polymer, except for the requirement that the finished styrenic polymer composition must contain less than 2 percent by weight of sulfur from b), it is not possible to provide hard and fast specific numerical values for such proportions inasmuch as the proportions and amounts used will vary depending upon the makeup and molecular weight range of the styrenic polymer being used, and the identities of the particular material being used as ingredient a). However in most cases the total quantity of ingredients a) and b) when suitably proportioned relative to each other will fall in the range of about 2 to about 20 percent, and preferably in the range of about 5 to about 15 percent, based on the total weight of the overall polymer composition. However, on the basis solely of the disclosure in this specification one skilled in the art will now be able by means of a few simple experiments with the particular materials selected for use, to readily determine suitable total amounts of ingredients a) and b) that should be used in any given styrenic polymer being used. Thus departures from the foregoing ranges may be made based on these teachings whenever such departures are deemed necessary or desirable under the particular circumstances involved, provided however that in all cases the amount of sulfur from b) is less than 2 percent by weight of the finished styrenic polymer composition. In any case the amounts used should not adversely affect in any material way and to any significant extent the properties of the resultant styrenic polymer for its intended use or application.

Other components

Such ingredients as extrusion aids (e.g., barium stearate or calcium stearate), acid scavengers (e.g., magnesium oxide or tetrasodium pyrophosphate), dyes, pigments, fillers, stabilizers, antioxidants, antistatic agents, reinforcing agents, and the like can be included in the compositions of this invention. Nucleating agents (e.g., talc, calcium silicate, or indigo) to control cell size are desirably included in the styrenic polymer compositions of this invention designed for producing expanded or foamed styrenic polymers. The particular materials selected for use in the composition of this invention should not materially affect adversely the properties of the finished polymer composition for its intended utility.

Extruded Styrenic Foams

Flame retarded styrenic polymer foams can be prepared conveniently and expeditiously by use of known procedures.

For example one useful general procedure involves heat plastifying a thermoplastic styrenic polymer composition of this invention in an extruder. From the extruder the heat plastified resin is passed into a mixer, such as a rotary mixer having a studded rotor encased within a housing which preferably has a studded internal surface that intermeshes with the studs on the rotor. The heat-plastified resin and a volatile foaming or blowing agent are fed into the inlet end of the mixer and discharged from the outlet end, the flow being in a generally axial direction. From the mixer, the gel is passed through coolers and from the coolers to a die which extrudes a generally rectangular board. Such a procedure is described for example in U.S. Pat. No. 5,011,866. Other procedures include use of systems in which the foam is extruded and foamed under sub-atmospheric, atmospheric and super-atmospheric pressure conditions. As indicated in U.S. Pat. No. 5,011,866, one useful sub-atmospheric (vacuum) extrusion process is described in U.S. Pat. No. 3,704,083. This process is indicated to be of advantage in that the type of vacuum system therein described does not require a low-permeability/high permeability blowing agent mixture, due to the influence of the vacuum on the foaming process. Other disclosures of suitable foaming technology appear, for example, in U.S. Pat. Nos. 2,450,436; 2,669,751; 2,740,157; 2,769,804; 3,072,584; and 3,215,647.

Foaming Agents

Any of a wide variety of known foaming agents or blowing agents can be used in producing the expanded or foamed flame resistant polymers of this invention. U.S. Pat. No. 3,960,792 gives a listing of some suitable materials. Generally speaking, volatile carbon-containing chemical substances are the most widely for this purpose. They include, for example, such materials as aliphatic hydrocarbons including ethane, ethylene, propane, propylene, butane, butylene, isobutane, pentane, neopentane, isopentane, hexane, heptane and mixtures thereof; volatile halocarbons and/or halohydrocarbons, such as methyl chloride, chlorofluoromethane, bromochlorodifluoromethane, 1,1,1-trifluoroethane, 1,1,1,2-tetrafluoroethane, dichlorofluoromethane, dichlorodifluoromethane, chlorotrifluoromethane, trichlorofluoromethane, sym-tetrachlorodifluoroethane, 1,2,2-trichloro- 1,1,2-trifluoroethane, sym-dichlorotetrafluoroethane; volatile tetraalkylsilanes, such as tetramethylsilane, ethyltrimethylsilane, isopropyltrimethylsilane, and n-propyltrimethylsilane; and mixtures of such materials. One preferred fluorine-containing blowing agent is 1,1-difluoroethane also known as HFC-152a (FORMACEL Z-2, E. I. duPont de Nemours and Co.) because of its reported desirable ecological properties. Water-containing vegetable matter such as finely-divided corn cob can also be used as blowing agents. As described in U.S. Pat. No. 4,559,367, such vegetable matter can also serve as fillers. Use of carbon dioxide as a foaming agent, or at least a component of the blowing agent, is particularly preferred because of its innocuous nature vis-a-vis the environment and its low cost. Methods of using carbon dioxide as a blowing agent are described, for example, in U.S. Pat. No. 5,006,566 wherein the blowing agent is 80 to 100% by weight of carbon dioxide and from 0 to 20% by weight of one or more halohydrocarbons or hydrocarbons that are gaseous at room temperature, in U.S. Pat. Nos. 5,189,071 and 5,189,072 wherein a preferred blowing agent is carbon dioxide and 1-chloro-1,1-difluoroethane in weight ratios of ⅝ to 50/50, and in U.S. Pat. No. 5,380,767 wherein preferred blowing agents comprise combinations of water and carbon dioxide. Such methods can be utilized with appropriate flame retarded styrenic polymers of this invention.

Expandable Styrenic Beads or Granules

The styrenic polymer compositions of this invention can be used in the production of expandable beads or granules having enhanced flame resistance. In general, these materials may be produced by use of equipment, process techniques and process conditions previously developed for this purpose, since the flame retardant compositions of this invention do not materially affect adversely the processing characteristics and overall properties of the styrenic polymer employed. Also, known and established techniques for expanding the expandable beads or granules, and for molding or forming the further expanded beads or granules into desired products are deemed generally applicable to the expandable beads or granules formed from the styrenic polymer compositions of this invention. Suitable technology for producing expandable beads or granules is disclosed, for example, in U.S. Pat. Nos. 2,681,321; 2,744,291; 2,779,062; 2,787,809; 2,950,261; 3,013,894; 3,086,885; 3,501,426; 3,663,466; 3,673,126; 3,793,242; 3,973,884; 4,459,373; 4,563,481; 4,990,539; 5,100,923; and 5,124,365. Procedures for converting expandable beads of styrenic polymers to foamed shapes is described, for example, in U.S. Pat. Nos. 3,674,387; 3,736,082; and 3,767,744.

The practice and advantages of this invention are demonstrated by the following examples which are presented for purposes of illustration and not limitation. In these examples polystyrene compositions for evaluation for flame resistance were prepared and subjected to ASTM Standard Test Method D 2863-87 commonly referred to as the limiting oxygen index (LOI) test. This test measures the minimum concentration of oxygen necessary to support candle-like combustion of the top end of a vertically held piece of plastic (in this case, formulated polystyrene specimens). The test specimens are five inches (12.7 cm) long by 0.25 inch (0.64 cm) wide by 0.125 inch (0.32 cm) thick. In brief, a specimen of a given composition is placed in a glass chimney in which a measured oxygen/nitrogen mixture flows upwardly. The specimen is ignited by means of a pilot flame and the burning behavior is observed. If the sample burns too rapidly, a new specimen of the same composition is tested at a lower oxygen concentration. If the sample does not burn within the prescribed limits, another new specimen of the same composition is tested at a higher oxygen concentration. This procedure is repeated until the lowest oxygen level is defined at which the prescribed limits of the test are achieved, and this is defined as the LOI for that composition. Thus the procedure is iterative and may take as many as 15 or so specimens for a sample with an unknown LOI. It will be seen that the higher the LOI, the more flame resistant the composition.

The test specimens were prepared using Styron 680 polystyrene from Dow Chemical Company. This material is an injection molding grade of unreinforced, additive-free polystyrene which has a peak weight average molecular weight in the range of 120,000 to 250,000. It has an LOI of 18.8. The test specimens are formed by mixing the flame retardant component(s) in the specified amounts with the polystyrene in a Brabender mixer for 8 to 10 minutes at 175° C., pressing the hot mixture on a hot plate at 175° C. for 2 to 4 minutes, and then cooling the pressed mixture to 50° C. for 10 minutes. Then the resultant sheet is allowed to stand at ambient room temperature for 48 hours and thereafter the test specimens of the proper size are cut from the sheet.

COMPARATIVE EXAMPLE

An extensive group of tests was conducted as described above wherein determinations were made of the effectiveness of elemental sulfur when used at several concentrations as the sole additive in the polystyrene, and of the effectiveness of a wide variety of halogen-free organic phosphorus compounds when used at various concentrations as the sole additive in the polystyrene. These results are summarized in Tables A and B, respectively.

TABLE A

Effect of Sulfur as the Sole Additive

| Run | Wt % Sulfur | LOI |
|---|---|---|
| A-1 | 10.0 | 22.3 |
| A-2 | 3.0 | 22.2 |
| A-3 | 1.0 | 21.9 |
| A-4 | 0.44 | 20.7 |
| A-5 | 0.18 | 19.0 |

TABLE B

Effect of Organic Phosphorus Compounds as the Sole Additive

| Run | Phosphorus Compound | Wt % | LOI |
|---|---|---|---|
| B-1 | Triphenyl phosphine | 5 | 20.1 |
| B-2 | Triphenyl phosphine | 10 | 21.1 |
| B-3 | Bis(diphenylphosphino)methane | 10 | 22.5 |
| B-4 | Triphenyl phosphine oxide | 10 | 21.8 |
| B-5 | Triphenyl phosphine sulfide | 10 | 22.2 |
| B-6 | Tetramethyl biphosphine disulfide | 10 | 23.3 |
| B-7 | Triphenyl phosphate | 5 | 19.9 |
| B-8 | Triphenyl phosphate | 10 | 21.1 |
| B-9 | Pentaerythritol phosphate | 10 | 20.6 |
| B-10 | (P,P-diphenyl)(pentaerythritol) diphosphate | 10 | 21.0 |
| B-11 | Trimethyl phosphate | 5 | 22.3 |
| B-12 | Triethyl phosphate | 5 | 21.4 |
| B-13 | Triethylphosphonothionate | 10 | 21.3 |
| B-14 | Trimethyl thiophosphate | 5 | 21.7 |
| B-15 | Trimethyl phosphoroformate | 5 | 21.6 |
| B-16 | Hexaphenoxytriphosphazene | 10 | 21.7 |
| B-17 | Hexapropoxytriphosphazene | 10 | 20.0 |
| B-18 | Tetramethyl methylene diphosphonate | 5 | 21.5 |
| B-19 | Oxabis(diphenylphosphine) | 10 | 21.9 |
| B-20 | Methylenebis(diphenylphosphine sulfide) | 10 | 22.2 |

EXAMPLES

Halogen-free flame retardant compositions of this invention were formed from the above polystyrene and various proportions of various halogen-free phosphorus compounds and elemental sulfur. Table C summarizes the formulations tested and the results obtained. For ease of reference, comparative results from Table B are interspersed at appropriate locations within Table C.

TABLE C

Effect of Organic Phosphorus Compounds Plus Elemental Sulfur

| Run | Phosphorus Additive and Wt % Thereof | Wt % Sulfur | LOI |
|---|---|---|---|
| B-11 | Trimethyl phosphate, 5% | None | 22.3 |
| C-1 | Trimethyl phosphate, 5% | 1% | 25.6 |
| C-2 | Trimethyl phosphate, 10% | 1% | 25.9 |
| B-19 | Oxabis(diphenylphosphine), 10% | None | 21.9 |
| C-3 | Oxabis(diphenylphosphine), 10% | 1% | 25.0 |
| B-7 | Triphenyl phosphate, 5% | None | 19.9 |
| B-3 | Triphenyl phosphate, 10% | None | 21.1 |
| C-4 | Triphenyl phosphate, 2.5% | 1.5% | 23.4 |
| C-5 | Triphenyl phosphate, 5% | 0.5% | 23.4 |
| C-6 | Triphenyl phosphate, 5% | 1% | 25.3 |
| C-7 | Triphenyl phosphate, 5% | 1.5% | 25.2 |
| C-8 | Triphenyl phosphate, 10% | 1% | 26.0 |
| C-9 | Triphenyl phosphate, 10% | 1.4% | 25.4 |
| B-1 | Triphenyl phosphine, 5% | None | 20.1 |
| B-2 | Triphenyl phosphine, 10% | None | 21.1 |
| C-10 | Triphenyl phosphine, 10% | 1% | 22.2 |
| B-4 | Triphenyl phosphine oxide, 10% | None | 21.8 |
| C-11 | Triphenyl phosphine oxide, 10% | 1% | 24.3 |
| B-5 | Triphenyl phosphine sulfide, 10% | None | 22.2 |
| C-12 | Triphenyl phosphine sulfide, 10% | 0.24% | 24.6 |
| C-13 | Triphenyl phosphine sulfide, 10% | 0.36% | 24.8 |
| C-14 | Triphenyl phosphine sulfide, 10% | 0.5% | 25.0 |
| C-15 | Triphenyl phosphine sulfide, 10% | 1% | 25.0 |
| B-10 | (P,P-diphenyl)(pentaerythritol) diphosphate, 10% | None | 21.0 |
| C-16 | (P,P-diphenyl)(pentaerythritol) diphosphate, 10% | 1% | 23.5 |
| C-17 | Diphenyl phosphinic acid, 5% | 1% | 24.0 |
| C-18 | Diphenyl phosphinic acid, 7% | 1% | 24.7 |
| C-19 | Diphenyl phosphinic acid, 10% | 0.5% | 24.6 |
| C-20 | Diphenyl phosphinic acid, 10% | 1% | 25.3 |
| B-6 | Tetramethyl biphosphine disulfide, 10% | None | 23.3 |
| C-21 | Tetramethyl biphosphine disulfide, 5% | 0.5% | 24.3 |
| C-22 | Tetramethyl biphosphine disulfide, 5% | 1% | 25.3 |
| B-16 | Hexaphenoxytriphosphazene, 10% | None | 21.7 |
| C-23 | Hexaphenoxytriphosphazene, 10% | 1% | 26.2 |

It can be seen from Table C that each of the compositions used in Runs C-1 to C-3, C-6 to C-9, and C-11 to C-23 gave an LOI of 24 or more and that of these, the compositions of C-1 to C-3, C-6 to C-9, C-12 to C-15, C-18 to C-20, and C-22 to C-23 gave an LOI of 25 or above. It can also be seen that the compositions of C-1 to C-2, C-8 and C-23 achieved LOI values of 26 or more. Hence all of these particular compositions are illustrative compositions of this invention. Table C also illustrates the fact that not all organic phosphorus compounds in all proportions with all proportions of elemental sulfur below 2% by weight of the composition achieve the requisite LOI of at least 24, hence the desirability of performing a few preliminary tests with any given composition in proportions not previously tested to determine its LOI value. The compositions of Runs C-8 and C-23 are among particularly preferred compositions because of their very high LOI ratings of 26.0 or above.

Further Description of Ingredient a)

Because the suitable types of halogen-free organic phosphorus compounds that can be used are so varied in chemical structure, the following listing is presented as a mere illustration of some of the types of compounds from which suitable candidate compounds for use as ingredient a) can be selected. Thus this listing is strictly illustrative and not limitary. Since it is impossible to test every known organic phosphorus compound for efficacy, only those compounds which give an LOI of at least 24 when suitably formulated and used in accordance with this disclosure are within the ambit of this invention.

Hydrocarbyl phosphines, hydrocarbyl phosphine oxides and hydrocarbyl phosphine sulfides of the formula

$$R_3P(=X)_n$$

wherein R can be the same or different and are hydrogen atoms or hydrocarbyl groups, at least one R being hydrocarbyl, X is an oxygen atom or a sulfur atom and n is zero or 1.

Hydrocarbyl phosphites and thiophosphites of the formula (RX)₃P wherein R can be the same or different and are hydrogen atoms or hydrocarbyl groups, at least one R being hydrocarbyl, and X can be the same or different and are oxygen atoms or sulfur atoms.

Hydrocarbyl phosphorous amides of the formula (R₂N)ₘPRₙ wherein R can be the same or different and are hydrocarbyl groups, m is a whole integer from 1 to 3, and n is an integer from zero to 2, the total of m and n being 3.

Hydrocarbyl phosphinous or thiophosphinous acids or esters of the formula (R)₂PXR wherein R can be the same or different and are hydrogen atoms or hydrocarbyl groups, at least one R being hydrocarbyl, and X is an oxygen atom or a sulfur atom.

Hydrocarbyl phosphonous or thiophosphonous acids or esters of the formula

RP(XR)₂ wherein R can be the same or different and are hydrogen atoms or hydrocarbyl groups, at least one R being hydrocarbyl, and X can be the same or different and are oxygen atoms or sulfur atoms.

Hydrocarbyl phosphates and thiophosphates of the formula (RX)₃PX wherein R can be the same or different and are hydrogen atoms or hydrocarbyl groups, at least one R being hydrocarbyl, and X can be the same or different and are oxygen atoms or sulfur atoms. Materials of this type, especially trihydrocarbyl phosphates, are among preferred compounds for use in the practice of this invention.

Hydrocarbyl phosphoric amides of the formula (R₂N)ₘRₙPX wherein R can be the same or different and are hydrogen atoms or hydrocarbyl groups, m is a whole integer from 1 to 3, X is an oxygen atom or a sulfur atom, and n is an integer from zero to 2, the total of m and n being 3.

Hydrocarbyl phosphoramidates and thiophosphoramidates of the formula (RO)₂(R₂N)PX wherein R can be the same or different and are hydrogen atoms or hydrocarbyl groups, and X is an oxygen atom or a sulfur atom.

Hydrocarbyl phosphinic or thiophosphinic acids or esters of the formula (R)₂(RX)PX wherein R can be the same or different and are hydrogen atoms or hydrocarbyl groups, at least one R being hydrocarbyl, and X can be the same or different and are oxygen atoms or sulfur atoms.

Hydrocarbyl phosphonic or thiophosphonic acids or esters of the formula (RX)₂RPX wherein R can be the same or different and are hydrogen atoms or hydrocarbyl groups, at least one R being hydrocarbyl, and X can be the same or different and are oxygen atoms or sulfur atoms.

Hydrocarbyl iminophosphoranes of the formula

R₃P=NR wherein R can be the same or different and are hydrogen atoms or hydrocarbyl groups, at least one R being hydrocarbyl.

Hydrocarbyl alkylidenetrihydrocarbylphosphoranes of the formula

R₃P=CR₂ wherein R can be the same or different and are hydrogen atoms or hydrocarbyl groups, at least one R being hydrocarbyl.

Cyclic hydrocarbyl phosphetanes, phospholanes and phosphorinanes wherein a trivalent phosphorus atom is part of a ring system having in addition to the phosphorus atom from 3 to 5 carbon atoms, the remaining phosphorus valence being satisfied by a hydrogen atom, a hydrocarbyl group, a hydrocarbyloxy group or a hydrocarbylthio group.

Cyclic hydrocarbyl phosphites, thiophosphites, phosphates, and thiophosphates wherein a phosphorus atom is part of a ring system having in addition to the phosphorus atom, 2 oxygen or sulfur atoms separately bonded thereto, each of which in turn is bonded to a terminal carbon atom of a hydrocarbyl chain of from 2 to about 6 carbon atoms, the remaining phosphorus valence (if trivalent phosphorus) being satisfied by a hydrogen atom, a hydrocarbyl group, a hydrocarbyloxy group or a hydrocarbylthio group, two of the remaining three phosphorus valances (if pentavalent phosphorus) being satisfied by a an oxygen atom or sulfur atom bonded thereto by a double bond and the remaining valence being satisfied by a hydrogen atom, a hydrocarbyl group, a hydrocarbyloxy group or a hydrocarbylthio group.

Cyclic hydrocarbyl polyphosphates, polythiophosphates, polyphosphites, and polythiophosphites having at least two cyclic groups in which in each such group a phosphorus atom is bonded to two terminal oxygen atoms of oxyalkyleneoxy group to form a cyclic phosphorus-containing moiety, wherein the phosphorus atoms of these cyclic moieties are bonded to terminal oxygen atoms of a bridging group derived by replacement of a hydrogen atom from at least two hydroxyl groups of a polyol, and wherein the phosphorus atoms if pentavalent have an oxygen or sulfur atom bonded thereto by a double bond. Note for example U.S. Pat. No. 2,952,701 which provides an illustration of one type of the diphosphates and dithiophosphates of this much broader class of compounds.

Linear and/or cyclic hydrocarbyloxy phosphazenes in the form of oligomers having in the range of from 3 to about 20 repeating —P=N— groups as the backbone of the oligomeric molecules, and wherein each of the phosphorus atoms is substituted by two hydrocarbyloxy groups, such as alkoxy, cycloalkoxy, aryloxy, aralkoxy, cycloalkylalkoxy, alkoxyalkoxy, aryloxyalkoxy, and their unsaturated analogs. Materials of this type are among preferred compounds for use in the practice of this invention.

On the basis of the experimental research work conducted to date, it appears that of the halogen-free organic phosphorus compounds, those which contain, in addition to phosphorus, carbon, and hydrogen, at least one oxygen atom or at least one sulfur atom in the molecule are generally more effective than other organic phosphorus compounds, when used with amounts of sulfur below 2% of the weight of the styrenic polymer composition, i.e., the weight of (a) the styrenic polymer, (b) the organic phosphorus additive(s), and (c) the elemental sulfur, that are present in the composition in whatever chemical form(s) such components exist in the styrenic polymer composition, and excluding the weight of other components that may be included therein. Accordingly, halogen-free organic phosphorus compounds which contain phosphorus, carbon, hydrogen, and at least one oxygen atom or at least one sulfur atom, and optionally at least one nitrogen atom in the molecule, which otherwise meet the requirements of this invention, are preferred.

Foamed styrenic polymers can be used in a variety of applications. For example, they can be used as dielectric material (U.S. Pat. No. 2,716,190); as insulative and decorative wall and ceiling board (U.S. Pat. No. 3,328,228); as structural panels (U.S. Pat. No. 3,637,459); as materials used in thermal insulation systems (U.S. Pat. No. 4,637,189); as materials used in roof construction (U.S. Pat. Nos. 3,492,196, 4,351,138 and 4,669,246); as packaging material (U.S. Pat. Nos. 3,503,177, 4,073,842, 4,640,080 and 5,086,919); as materials in display and advertising boards (U.S. Pat. No. 4,128,695); in forming crash padding and cushioning (U.S. Pat. No. 3,607,797); as shock absorbing material (U.S. Pat. No. 3,440,184); as insulating board (U.S. Pat. No. 3,445,404); in plaza deck construction (U.S. Pat. No. 5,067,298); in manufacture of shoe soles and wood substitutes (U.S. Pat. No. 3,973,884); and in forming lightweight plaster or stucco mixtures (U.S. Pat. No. 4,245,054 and 5,124,365). Flame retarded non-foamed styrenic polymers of this invention can be used for various known applications such as in the formation of decorative and structural molded products.

It is to be understood that the terms "ingredient" or "component" or "substance" as used anywhere in the specification or claims hereof, whether the term is used in the singular or plural, are used in the sense that it is a substance employed in forming the composition referred to, and thus at least prior to inclusion, mixing or blending with other ingredients or components, the ingredient or component is in the chemical form specified. It matters not what chemical changes, transformations and/or reactions, if any, take place in the mixture or reaction medium itself as such changes, transformations and/or reactions are the natural result of bringing the specified ingredients or components together under the conditions called for pursuant to this disclosure. In like manner, the styrenic polymer is of course an ingredient or a component of the resultant composition even though it is usually present in larger quantity than the additives blended therewith. Thus all references to styrenic polymers in general, or to any given styrenic polymer such as polystyrene, are to be understood as referring to the polymer employed in forming the composition referred to, and thus at least prior to inclusion, mixing or blending therewith of other ingredients or components, the polymer is in the chemical form specified. It matters not what chemical changes, transformations and/or reactions, if any, take place in the polymer itself as such changes, transformations and/or reactions are the natural result of bringing the specified ingredients or components together with the styrenic polymer under the conditions called for pursuant to this disclosure. It is also to be understood that even though the claims hereinafter may refer to substances in the present tense ("comprises", "is", etc.), the reference is to the substance, as it existed at the time just before it was first contacted, blended or mixed with one or more other substances in accordance with the present disclosure. The fact that a substance may lose its original identity through a chemical reaction, complex formation, solvation, ionization, or other transformation during the course of contacting, blending or mixing operations, if done in accordance with the disclosure hereof, is within the purview and scope of this invention.

Reference is made in this specification and in the appended claims to the feature that the resultant styrenic polymer can provide test specimens which exhibit an LOI of at least 24 (or more) if tested in accordance with ASTM Standard Test Method D 2863-87. In order to avoid any possible mis-construction of this feature, let it be clearly understood that use of the plural for "specimens" in the foregoing phraseology means that if the test is applied to any given composition in question, the fact that two (2) test specimens of that polymer composition out of a group of fifteen (15) test specimens thereof (whether or not all are 15 are tested) give the specified LOI value is enough to show that the composition meets this particular requirement of this invention.

Each and every patent or other publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A composition which comprises:
   I) a styrenic polymer and
   II) as a flame retardant therefor, a combination of the following ingredients:
      a) at least one organic phosphorus additive that (i) is halogen-free, and (ii) is composed solely of carbon, hydrogen, and phosphorus, and optionally one or more of the elements nitrogen, oxygen, and sulfur; and
      b) elemental sulfur;
   in proportions such that (i) the sulfur content from b) is less than 2 percent by weight of the weight of the styrenic polymer and ingredients a) and b) in whatever chemical composition(s) and form(s) said styrenic polymer and said ingredients, exist in said styrenic polymer, and (ii) said styrenic polymer plus said combination of ingredients a) and b) can provide test specimens which exhibit an LOI of at least 24 if tested in accordance with ASTM Standard Test Method D 2863-87, wherein the weight ratio of sulfur in b) to phosphorus in a) is below 15:1 and the total concentration of the flame retardant combination a) and b) is within the range of about 2 to about 20 percent by weight of the total polymer composition.

2. A composition according to claim 1 wherein the styrenic polymer is polystyrene.

3. A composition according to claim 1 wherein at least one said organic phosphorus additive is composed solely of carbon, hydrogen, phosphorus, and at least oxygen and/or sulfur, and optionally nitrogen.

4. A composition according to claim 1 wherein ingredient a) is one or more organic phosphorus additives that is or are composed solely of carbon, hydrogen, oxygen and phosphorus.

5. A composition according to claim 1 wherein ingredient a) is one or more organic phosphorus additives that is or are composed solely of carbon, hydrogen, sulfur and phosphorus.

6. A composition according to claim 1 wherein ingredient a) is one or more organic phosphorus additives that is or are composed solely of carbon, hydrogen, oxygen, nitrogen and phosphorus.

7. A composition according to claim 1 wherein ingredient a) is one or more organic phosphates.

8. A composition according to claim 1 wherein ingredient a) is one or more organic polyphosphazenes.

9. A composition according to claim 1 wherein ingredient a) is one or more organic pentavalent phosphorus additives.

10. A composition according to claim 1 wherein the phosphorus content of ingredient a) is not less than about 6 percent by weight.

11. A composition according to claim 1 wherein ingredient a) is one or more trihydrocarbyl phosphates.

12. A composition according to claim 1 wherein ingredient a) is triphenyl phosphate.

13. A composition according to claim 1 wherein ingredient a) is one or more hexahydrocarbyloxytriphosphazenes.

14. A composition according to claim 1 wherein ingredient a) is hexaphenoxytriphosphazene.

15. A composition according to claim 1 wherein ingredient a) is hexaphenoxytriphosphazene.

16. A composition according to claim 1 wherein said LOI is at least 25.

17. A composition according to claim 1 wherein said LOI is at least 26.

18. A composition according to claim 1 wherein said sulfur content from b) is 1.5 percent by weight or less.

19. A composition according to claim 1 wherein said sulfur content from b) is 1 percent by weight or less.

20. A composition which comprises:
I) a polystyrene suitable for preparation of foamed or expanded polystyrene, and
II) as a flame retardant for said polystyrene, a combination of the following ingredients, said combination being blended into said polystyrene as separate ingredients, as a preblend of said ingredients, and/or as a masterbatch of said ingredients:
  a) at least one organic phosphorus additive that (i) is halogen-free, and (ii) is composed solely of carbon, hydrogen, phosphorus, and oxygen, and optionally sulfur and/or nitrogen, or is composed solely of carbon, hydrogen, phosphorus, and sulfur, and optionally nitrogen; and
  b) elemental sulfur;
in proportions such that (i) the sulfur content from b) is 1.5 percent by weight, or less than 1.5 percent by weight, of the weight of the polystyrene plus the weight of ingredients a) and b) in whatever chemical composition(s) and form(s) the polystyrene and said ingredients exist in said polystyrene, and (ii) said polystyrene plus said combination of ingredients a) and b) can provide test specimens which exhibit an LOI of at least 24 if tested in accordance with ASTM Standard Test Method D 2863-87, wherein the weight ratio of sulfur in b) to phosphorus in a) is below 15:1 and the total concentration of the flame retardant combination a) and b) is within the range of about 2 to about 20 percent by weight of the total polymer composition.

21. A composition according to claim 20 wherein the polystyrene has a peak number average molecular weight in the range of 120,000 to 250,000.

22. A composition according to claim 20 wherein at least one said organic phosphorus additive is composed solely of carbon, hydrogen, phosphorus, and at least oxygen and/or sulfur, and optionally nitrogen.

23. A composition according to claim 20 wherein ingredient a) is one or more organic phosphorus additives that is or are composed solely of carbon, hydrogen, oxygen and phosphorus.

24. A composition according to claim 20 wherein ingredient a) is one or more organic phosphorus additives that is or are composed solely of carbon, hydrogen, sulfur and phosphorus.

25. A composition according to claim 20 wherein ingredient a) is one or more organic phosphorus additives that is or are composed solely of carbon, hydrogen, oxygen, nitrogen and phosphorus.

26. A composition according to claim 20 wherein ingredient a) is one or more organic phosphates.

27. A composition according to claim 20 wherein ingredient a) is one or more organic polyphosphazenes.

28. A composition according to claim 20 wherein ingredient a) is one or more organic pentavalent phosphorus additives.

29. A composition according to claim 20 wherein the phosphorus content of ingredient a) is not less than about 6 percent by weight.

30. A composition according to claim 20 wherein ingredient a) is one or more trihydrocarbyl phosphates.

31. A composition according to claim 20 wherein ingredient a) is triphenyl phosphate.

32. A composition according to claim 20 wherein ingredient a) is one or more hexahydrocarbyloxytriphosphazenes.

33. A composition according to claim 20 wherein ingredient a) is hexaphenoxytriphosphazene.

34. A composition according to claim 20 wherein ingredient a) is hexaphenoxytriphosphazene.

35. A composition according to claim 20 wherein said LOI is at least 25.

36. A composition according to claim 20 wherein said LOI is at least 26.

37. A composition according to claim 20 wherein said sulfur content from b) is 1 percent by weight or less.

38. A composition according to claim 37 wherein at least one said organic phosphorus additive is composed solely of carbon, hydrogen, phosphorus, and at least oxygen and/or sulfur, and optionally nitrogen.

39. A composition according to claim 37 wherein ingredient a) is one or more organic phosphates.

40. A composition according to claim 37 wherein the polystyrene has a peak number average molecular weight in the range of 120,000 to 250,000.

41. A method of rendering a styrenic polymer flame resistant which comprises incorporating therein individually, as a preblend, and/or as a masterbatch in styrenic polymer
  a) at least one organic phosphorus additive that (i) is halogen-free, and (ii) is composed solely of carbon, hydrogen, and phosphorus, and optionally one or more of the elements nitrogen, oxygen, and sulfur; and
  b) elemental sulfur;
in relative proportions and in amounts such that (i) the sulfur content from b) is less than 2 percent by weight of the weight of the styrenic polymer plus the weight of a) and b) in whatever chemical composition(s) and form(s) the styrenic polymer and a) and b) exist in said styrenic polymer, and (ii) said styrenic polymer plus said combination of ingredients a) and b) can provide test specimens which exhibit an LOI of at least 24 if tested in accordance with ASTM Standard Test Method D 2863-87, wherein the weight ratio of sulfur in b) to phosphorus in a) is below 15:1 and the total concentration of the flame retardant combination a) and b) is within the range of about 2 to about 20 percent by weight of the total polymer composition.

42. A method according to claim 41 wherein at least one said organic phosphorus additive is composed solely of carbon, hydrogen, phosphorus, and at least oxygen and/or sulfur, and optionally nitrogen.

43. A method according to claim 41 wherein ingredient a) is one or more organic phosphates.

44. A method according to claim 41 wherein ingredient a) is one or more organic polyphosphazenes.

45. A method according to claim 42 wherein the styrenic polymer is polystyrene and wherein said LOI is at least 25.

46. A method according to claim 42 wherein said sulfur content is 1.5 percent by weight or less.

47. A method according to claim 42 wherein said sulfur content is 1 percent by weight or less.

48. A method according to claim 42 wherein said organic phosphorus additive has a phosphorus content of not less than about 6 percent by weight.

49. A method of preparing an extruded styrenic polymer foam which comprises (i) expressing a heat-plastified styrenic polymer gel containing at least one volatile fluid foaming agent from a die into a region of lower pressure so that the expressed gel expands into cellular form, and (ii) cooling the expanded cellular polymer to a temperature at which the expanded foam is self- supporting; said styrenic polymer being characterized in that before, during or after the formation thereof there was incorporated therein:

a) at least one organic phosphorus additive that (i) is halogen-free, and (ii) is composed solely of carbon, hydrogen, and phosphorus, and optionally one or more of the elements nitrogen, oxygen, and sulfur; and b) elemental sulfur;

in relative proportions and in amounts such that (i) the sulfur content from b) is less than 2 percent by weight of the weight of the styrenic polymer plus the weight of a) and b) in whatever chemical composition(s) and form(s) the styrenic polymer and a) and b) exist in said styrenic polymer, and (ii) said styrenic polymer plus said combination of ingredients a) and b) prior to foaming can provide test specimens that exhibit an LOI of at least 24 if tested in accordance with ASTM Standard Test Method D 2863-87, wherein the weight ratio of sulfur in b) to phosphorus in a) is below 15:1 and the total concentration of the flame retardant combination a) and b) is within the range of about 2 to about 20 percent by weight of the total polymer composition.

50. A method according to claim 49 wherein at least one said organic phosphorus additive is composed solely of carbon, hydrogen, phosphorus, and at least oxygen and/or sulfur, and optionally nitrogen.

51. A method according to claim 49 wherein said organic phosphorus additive has a phosphorus content of not less than about 6 percent by weight.

52. A method according to claim 50 wherein the styrenic polymer is polystyrene, wherein ingredient a) is one or more organic phosphates, and wherein said LOI is at least 25.

53. A method according to claim 50 wherein said sulfur content is 1.5 percent by weight or less.

54. A method according to claim 50 wherein said sulfur content is 1 percent by weight or less.

55. A method of preparing flame retardant expandable granules or beads of a styrenic polymer which comprises impregnating granules of a flame retarded styrenic polymer with a volatile fluid foaming agent under temperature and pressure conditions such that fluid foaming agent permeates into the polymer granules to form generally spherical particles capable of further expansion, and cooling and recovering the particles so formed; said styrenic polymer being characterized in that before, during or after the formation thereof there was incorporated therein:

a) at least one organic phosphorus additive that (i) is halogen-free, and (ii) is composed solely of carbon, hydrogen, and phosphorus, and optionally one or more of the elements nitrogen, oxygen, and sulfur; and b) elemental sulfur;

in relative proportions and in amounts such that (i) the sulfur content from b) is less than 2 percent by weight of the weight of the styrenic polymer plus the weight of a) and b) in whatever chemical composition(s) and form(s) the styrenic polymer and a) and b) exist in said styrenic polymer, and (ii) said styrenic polymer plus said combination of ingredients a) and b) prior to foaming can provide test specimens that exhibit an LOI of at least 24 if tested in accordance with ASTM Standard Test Method D 2863-87, wherein the weight ratio of sulfur in b) to phosphorus in a) is below 15:1 and the total concentration of the flame retardant combination a) and b) is within the range of about 2 to about 20 percent by weight of the total polymer composition.

56. A method according to claim 55 wherein at least one said organic phosphorus additive is composed solely of carbon, hydrogen, phosphorus, and at least oxygen and/or sulfur, and optionally nitrogen.

57. A method according to claim 55 wherein the granules are impregnating while in an aqueous suspension.

58. A method according to claim 56 wherein said organic phosphorus additive has a phosphorus content of not less than about 6 percent by weight.

59. A method according to claim 56 wherein the styrenic polymer is polystyrene, wherein ingredient a) is one or more organic phosphates, and wherein said LOI is at least 25.

60. A method according to claim 56 wherein said sulfur content is 1.5 percent by weight or less.

61. A method according to claim 56 wherein said sulfur content is 1 percent by weight or less.

* * * * *